Patented June 7, 1932

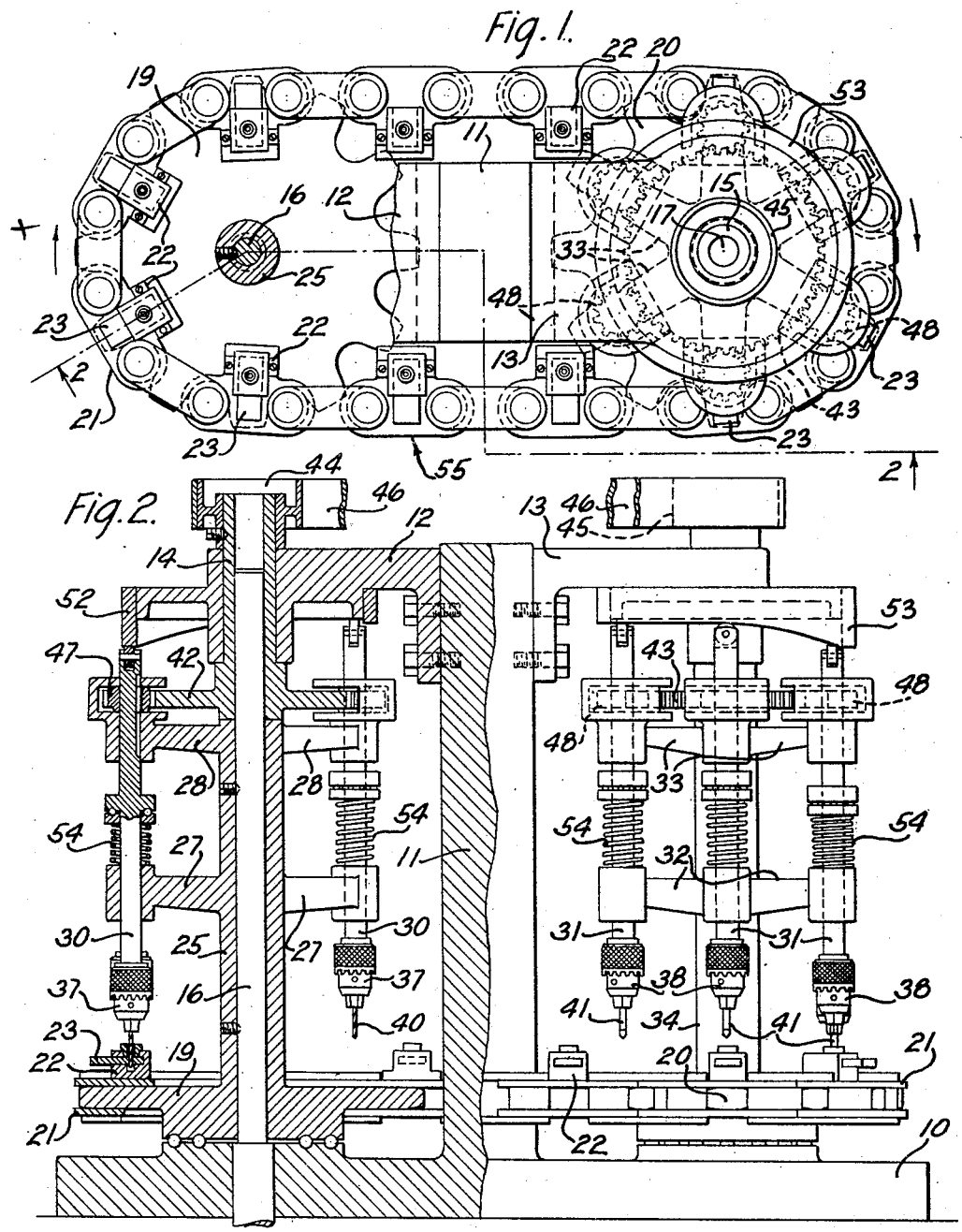

1,861,574

UNITED STATES PATENT OFFICE

HOMER WALDO LARSON, OF DOWNERS GROVE, AND ROBERT HAND PATCHEN, OF CHICAGO, ILLINOIS, ASSIGNORS TO WESTERN ELECTRIC COMPANY, INCORPORATED, OF NEW YORK, N. Y., A CORPORATION OF NEW YORK

MATERIAL WORKING APPARATUS

Application filed November 16, 1928. Serial No. 319,985.

This invention relates to material working apparatus, and more particularly to an apparatus for performing various operations upon small parts.

The principal object of the invention is to provide a simple and inexpensive apparatus whereby various operations may be expeditiously and economically performed upon small parts.

In accordance with the general features of the invention there is provided in one embodiment thereof an apparatus for performing drilling, counter-sinking and similar operations upon small metal parts, wherein the parts are continuously advanced by an endless chain conveyor having uninterrupted travel over a plurality of rotatable sprockets. Tools for operating upon the moving parts are arranged so as to be movable with the rotating sprockets whereby various operations may be performed upon the parts while they are continuously advanced by the conveyor chain.

Other features and advantages of the invention will become apparent from the following detailed description, reference being had to the accompanying drawing wherein like reference numerals have been employed to designate corresponding parts throughout the several views and in which, Fig. 1 is a plan view, partly in section, of an apparatus embodying the features of the invention, and Fig. 2 is a vertical section, partly in elevation, taken on line 2—2 of Fig. 1.

Referring now to the drawing in detail, it will be observed that the main supporting framework comprises a horizontal base member 10 and a centrally disposed vertical frame member 11. Secured to the upper end of the vertical frame member 11 on opposite sides thereof are brackets 12 and 13 having sleeves or bushings 14 and 15, respectively, rotatably journaled therein. Vertically disposed shafts 16 and 17 are rotatably journaled at their lower ends in the base member 10 and are journaled at their upper ends in the bushings 14 and 15, respectively.

Sprockets 19 and 20 are secured to the lower ends of the shafts 16 and 17, respectively, so as to be rotatable therewith. An endless chain conveyor 21 is arranged to travel around the sprockets 19 and 20 and is provided with suitable fixtures 22—22 for receiving and supporting parts 23 which are to be operated upon. The fixtures 22 are preferably removably secured to individual links of the conveyor chain so that they may be readily interchanged with various other types of fixtures for accommodating parts of various shapes and sizes.

As shown in Fig. 2, the shaft 16 extends below the base member 10 whereby it may be connected to any suitable source of power (not shown) for continuously advancing the conveyor chain 21. The sprocket 19 is formed with an elongated sleeve 25 having spaced radially disposed arms 27 and 28 formed integral therewith. Vertically disposed spindles 30, 30 are rotatably journaled in suitable bearings formed at the extremities of the arms 27 and 28. Vertical spindles 31, 31, similar to spindles 30, are rotatably journaled in suitable bearings provided at the extremities of radially disposed arms 32 and 33 formed integral with an elongated sleeve 34 of the sprocket 20. The spindles 30 and 31 are arranged to be vertically slidable in their bearings and are provided at their lower extremities with tool supporting chucks 37 and 38, respectively. These chucks may be of any well known construction adapted to accommodate various types of tools. In the embodiment of the invention illustrated in the drawing, drills 40, 40 are associated with the chucks 37 of the spindles 30 and suitable countersinking tools 41, 41 are associated with the chucks 38 of the spindles 31.

The spindles 30 and 31 are driven by gears 42 and 43 respectively, secured to or formed integral with the sleeves 14 and 15, respectively. The gears 42 and 43 may, in turn, be driven through pulleys 44 and 45 and a belt 46 by any suitable source of power (not shown). The spindles 30 and 31 have gears 47 and 48 respectively, slidably keyed thereto which mesh with the gears 42 and 43, respectively. The operating tools 40 and 41 are moved into operative engagement with the work by means of annular cams 52 and 53 secured to the brackets 12 and 13, respectively, compression springs 54, 54 being provided for holding the tool carrying spindles in contact with the cams at all times.

It is believed that the operation of the above described apparatus will be more clearly understood by referring to the drawing. The conveyer chain 21 is continuously advanced by the positively driven sprocket wheel 19 in the direction indicated by the arrows in Fig. 1. The fixtures 22 are carried by the conveyor chain and as each fixture arrives at the position indicated by the reference numeral 55 (Fig. 1) a part 23 is inserted therein. As the parts are carried around the sprocket 19 the drilling tools 40, which are also carried by this sprocket, are moved into operative engagement with the parts by the cam 52. After the completion of the drilling operation the compression springs 54 cause the withdrawal of the tools to their normal positions.

It will be obvious that the above described drilling operation upon the parts is carried on while the parts are continuously advanced around the sprocket wheel 19. With the drilling operation completed the parts are carried by the conveyor chain around the sprocket 20 and while continuously advancing around this sprocket the previously drilled holes are countersunk by the tools 41 in the same manner as described in connection with the drilling tools 40. Thus it will be understood that by employing an apparatus embodying features of the invention, drilling, countersinking and various other operations may be economically and expeditiously performed upon parts of various kinds. Although the improved apparatus may be employed to particular advantage in connection with the manufacture of heavy running parts, it is obviously not limited to such usage.

It is to be understood that the invention is not limited to the specific embodiment herein illustrated and described, but is capable of numerous other applications within the scope of the appended claims.

What is claimed is:

1. In an apparatus for operating upon parts, a plurality of rotatable sprockets, an endless conveyor chain movable around said sprockets, means carried by the conveyor chain for supporting parts to be operated upon, means for driving the conveyor chain to continuously advance the parts, operating tools supported by the sprockets for performing work upon the continuously advancing parts, and a rotatable member coaxial with each of the sprockets for driving the tools associated therewith.

2. In an apparatus for operating upon parts, an endless conveyor for receiving and supporting a part, a sprocket for continuously advancing the conveyor to continuously advance the part, an operating tool supported and carried by the sprocket so as to be movable with the advancing part, a rotatable member coaxial with the sprocket for driving the tool, and an annular cam concentric with the sprocket for causing a relative movement between the tool and the part simultaneously with the advancement of the tool with the part.

3. In a material working machine, a sequence of work holding fixtures; a rotary table adapted to receive, support immovably relatively to itself, transport, and relinquish the fixtures in sequence; a tool-guide rigidly attached to and rotatable with the table; a tool supported rotatably in the tool-guide with freedom of linear motion in only one direction relative thereto; means to move the tool linearly; means independent thereof to rotate the tool; and means to feed the sequence of fixtures to and receive it from the table.

In witness whereof, we hereunto subscribe our names this 30th day of October, A. D. 1928.

HOMER WALDO LARSON.
ROBERT HAND PATCHEN.